United States Patent [19]
Tanaka

[11] Patent Number: 5,908,364
[45] Date of Patent: Jun. 1, 1999

[54] CHAIN DRIVE MECHANISM HAVING NOISE PREVENTING STRUCTURE

[75] Inventor: Koji Tanaka, Osaka, Japan

[73] Assignee: Tsubakimoto Chain Co., Osaka, Japan

[21] Appl. No.: 08/823,436

[22] Filed: Mar. 24, 1997

[30] Foreign Application Priority Data

Mar. 25, 1996 [JP] Japan ..................................... 8-068177

[51] Int. Cl.$^6$ .................................. F16H 7/06; F16H 7/18
[52] U.S. Cl. .......................... 474/202; 474/148; 474/153; 474/156
[58] Field of Search .................................. 474/140, 148, 474/152, 153, 155, 156, 202

[56] References Cited

U.S. PATENT DOCUMENTS

| | | | |
|---|---|---|---|
| 616,072 | 12/1898 | Bradley | 474/156 |
| 1,624,892 | 4/1927 | Kottlowski | 474/156 |
| 1,870,801 | 8/1932 | Engstrom | 474/156 |
| 2,492,219 | 12/1949 | Haefeli | 474/148 |
| 2,953,930 | 9/1960 | Meyer | 474/148 |
| 3,448,629 | 6/1969 | Pfrank et al. | 474/148 |
| 4,087,136 | 5/1978 | Boggs et al. | 474/152 X |
| 4,261,214 | 4/1981 | Watanabe et al. | 474/156 |
| 5,346,429 | 9/1994 | Farley | 474/140 X |

FOREIGN PATENT DOCUMENTS

| | | | |
|---|---|---|---|
| 812827 | 5/1937 | France | 474/156 |
| 57-69168 | 4/1982 | Japan | 474/156 |
| 58-17250 | 2/1983 | Japan . | |
| 61-37894 | 11/1986 | Japan . | |
| 63-126659 | 8/1988 | Japan . | |

Primary Examiner—Daniel P. Stodola
Assistant Examiner—Gregory J. Strimbu
Attorney, Agent, or Firm—Armstrong, Westerman, Hattori, McLeland & Naughton

[57] ABSTRACT

A noise preventing roller chain structure greatly reduces noise generated when a roller chain engages a sprocket or travels on a chain guide. The roller chain has a roller whose axial length is less than the space between opposed inner plates of the chain. A circumferentially continuous ridge portion is formed on the outer peripheral surface of the roller. A groove is formed in either the toothed surface of the sprocket or in the roller bearing surface of the chain guide. The ridge portion is fitted in the groove to guide and hold both end faces of the roller in a position spaced from the respective inner plates. An elastic member is embedded in the groove. It is thus possible to prevent the rubbing of the roller end faces with the surfaces of the inner plates and, concomitantly, the sound generated when the roller of the roller chain engages the sprocket or travels on the chain guide.

6 Claims, 4 Drawing Sheets

FIG.3A  FIG.3B  FIG.3C
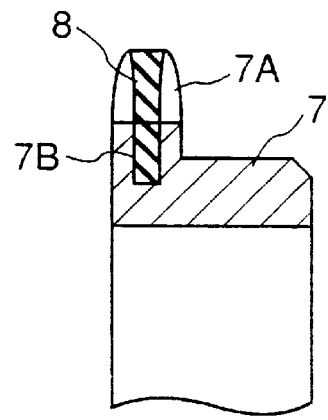 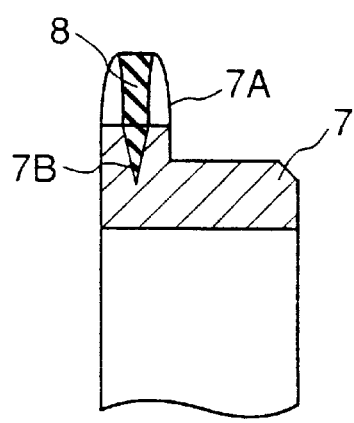 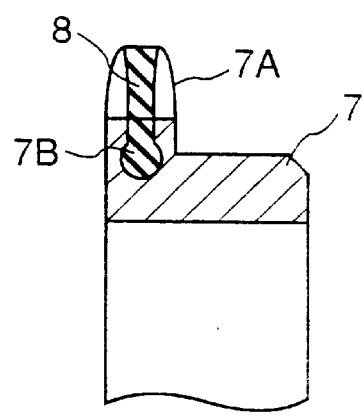
FIG.4
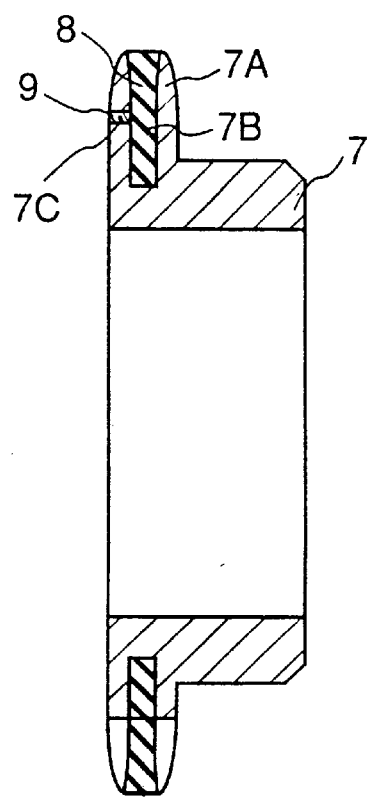

CHAIN DRIVE MECHANISM HAVING NOISE PREVENTING STRUCTURE

BACKGROUND OF THE INVENTION

1. Field of the Present Invention

The present invention relates to a noise preventing structure of a roller chain for suppressing a noise generated upon engagement of a roller chain with a sprocket or when a roller chain slides on a chain guide.

2. Description of Related Art

Heretofore, various proposals have been made for suppressing a noise generated upon engagement of a roller chain with a sprocket. For example, reference is here made to Japanese Patent Laid Open No. 17250/83, in which a hole is formed in the toothed bottom of a sprocket, a cylindrical member formed of urethane rubber is fixed into the hole, and a prismatic member also formed of urethane rubber is inserted inside the cylindrical member so that an end portion of the prismatic member projects from the toothed bottom of the sprocket. It is intended to suppress an impulsive sound by abutment of a roller with the end portion of the prismatic member.

In Japanese Utility Model Laid Open No. 126659/88, a noise suppressing structure is proposed in which an intermediate layer of an elastic material is sandwiched in between a pair of metallic plates having the same shape of teeth on the respective outer peripheral surfaces, to constitute a sprocket. The intermediate layer is partially projected from the toothed surface to form a buffer portion. A collision sound, resulting from collision of a roller with the sprocket toothed surface upon engagement of a chain with the sprocket, is suppressed by the buffer portion projecting from the toothed surface.

Further, a noise suppressing structure has been proposed in which a circumferential slot, deeper than the toothed bottom of a sprocket, is formed centrally of the width of the teeth of the sprocket toothed surface, and an elastic ring is fitted in the slot. The elastic ring has soundproofing teeth implanted therein. The soundproofing teeth are formed of a synthetic resin and project somewhat beyond the sprocket toothed top, to buffer the collision between a roller and the sprocket toothed surface upon engagement of a chain with the sprocket, thereby suppressing the resulting noise.

However, in all of the conventional noise suppressing structures referred to above, a noise generated by collision of a roller with the sprocket toothed surface or toothed bottom upon chain-sprocket engagement is intended to be suppressed, with no measures being taken against a rubbing sound generated between the inside surfaces of inner plates of the chain and both end faces of the roller.

More particularly, when the chain engages the sprocket, the roller comes into abutment against the toothed surface of the sprocket and thereby rotates, so that the inner plates and the end faces of the rotating roller rub against each other, thus generating a rubbing sound. This rubbing sound is generated not only upon chain-sprocket engagement, but also when the chain moves while being guided by a chain guide. Thus, it has so far been impossible to completely prevent the generation of noise in a chain drive.

SUMMARY OF THE INVENTION

It is an object of the present invention to solve the above-mentioned problem of the prior art and provide a noise preventing structure of a roller chain capable of suppressing noise generated upon engagement of the roller chain with a sprocket or when the roller chain moves along a chain guide.

In order to achieve the above-mentioned object, a noise preventing structure of a roller chain is provided, according to a first aspect of the present invention, in which a circumferentially continuous ridge portion is formed on the outer peripheral surface of a roller and a slot is formed in the toothed surface of a sprocket with which the roller comes into engagement. The ridge portion is fitted in the slot upon engagement of the roller with the sprocket to guide and hold both end faces of the roller in positions spaced from inner plates, wherein the inner plates are located on both sides of the roller. An elastic member, for abutment with the ridge portion upon engagement of the roller with the sprocket to exhibit a buffer action, is embedded in the slot.

In the second aspect of the present invention, a noise preventing structure of a roller chain is provided in which a circumferentially continuous ridge portion is formed on the outer peripheral surface of a roller. A slot is formed in a roller bearing surface of a chain guide and the roller bearing surface is for rolling of the roller thereon. The ridge portion is fitted in the slot upon rolling of the roller on the roller bearing surface to guide and hold both end faces of the roller in positions spaced from inner plates located on both sides of the roller. An elastic member is embedded in the slot for abutment with the ridge portion to exhibit a buffer action.

According to the noise preventing structure of a roller chain in the first aspect of the present invention, upon engagement of the roller with the sprocket toothed surface, the ridge portion of the roller comes into abutment with the elastic member embedded in the slot which is formed in the sprocket toothed surface, so that the energy of collision at the instant of the engagement is absorbed by the elastic member to suppress the sound of the collision which results. Furthermore, the vibration of the sprocket is dampened to suppress the chatter of the sprocket which results from the collision.

At this time, the inner plates located on both sides of the roller are restricted in their transverse movement by both side faces of the toothed sprocket, so that when the ridge portion of the roller gets into the slot formed in the sprocket toothed surface while causing an elastic deformation of the elastic member, both end faces of the roller are guided and held in positions spaced from the inner plates which are located on the right and left sides of the roller, thereby preventing the generation of a rubbing sound between both end faces of the roller and the right and left inner plates.

According to the noise preventing structure of a roller chain in the second aspect of the present invention, when the roller chain moves while being guided by the chain guide, the ridge portion of the roller, which is rolling on the roller bearing surface of the chain guide, comes into abutment with the elastic member embedded in the slot which is formed in the roller bearing surface, whereby the noise generated by moving contact of the roller chain with the chain guide is suppressed by the elastic member.

At this time, the transverse movement of inner plates located on both sides of the roller is restricted by plate guide faces formed on both sides of the roller bearing surface of the chain guide, so that when the ridge portion of the roller is fitted in the slot formed in the roller bearing surface of the chain guide while causing an elastic deformation of the elastic member, both end aces of the roller are guided and held in positions spaced from the right and left inner plates to prevent the generation of noise between both end faces of the roller and the right and left inner plates.

BRIEF DESCRIPTION OF THE DRAWING FIGURES

FIG. 1 is a longitudinal cross-sectional view showing a principal portion of a noise preventing structure of a roller chain according to a first embodiment of the present invention;

FIGS. 2(a), 2(b), and 2(c) show different examples of cross-sectional shapes of ridge portions each formed on a roller;

FIGS. 3(a), 3(b), and 3(c) show different examples of cross-sectional shapes of slots each formed in the toothed surface of a sprocket and elastic members embedded in the slots;

FIG. 4 is a cross-sectional view of a sprocket, showing an example of a structure for holding an elastic member embedded in a slot;

FIGS. 5A–E show different stages in the process of fabricating a sprocket with an elastic member embedded in a slot thereof; and FIG. 6 is a longitudinal cross-sectional view showing a principal portion of a noise preventing structure of a roller chain according to a second embodiment of the present invention.

DESCRIPTION OF THE PREFERRED EMBODIMENTS

Figure 1:
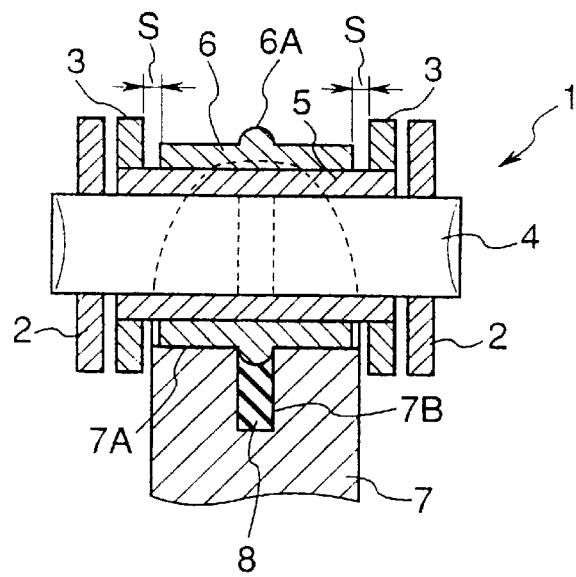

Embodiments of the present invention will be described hereinunder with reference to the accompanying drawing figures. FIG. 1 is a cross-sectional view showing a noise preventing structure of a roller chain according to a first embodiment of the present invention. A roller chain 1 comprises: a pair of right and left outer plates 2; a pair of right and left inner plates 3; a chain pin 4 which connects the right outer plate to the left outer plate of the pair of outer plates 2; a bushing 5 fitted rotatably on the outer peripheral surface of the chain pin 4; and a roller 6 fitted rotatably on the outer peripheral surface of the bushing 5.

The length of the roller 6 is shorter than the spacing between the paired inner plates 3. A ridge portion 6A, which is continuous in the circumferential direction, is formed centrally of the outer peripheral surface of the roller 6.

On the other hand, as shown in the same figure, in a toothed surface 7A of a sprocket 7 for engagement with the roller chain 1, a slot 7B is formed for fitting therein of the ridge portion 6A therein upon roller chain-sprocket engagement, with an elastic member 8 (for example, of rubber or plastic material) being embedded in the slot 7B. The surface of the elastic member 8 exposed from the slot 7B is substantially flush with the toothed surface 7A when no external force is exerted thereon. In the state shown in FIG. 1, in which the roller 6 of the roller chain 1 is meshed with the toothed surface 7A of the sprocket 7, the elastic member 8 is deformed elastically by the ridge portion 6A formed on the outer peripheral surface of the roller 6 and is pushed into the slot 7B. Then, the outer peripheral surface of the roller 6 comes into abutment with the toothed surface 7A.

Once the ridge portion 6A is thus fitted into the slot 7B, the transverse movement of the roller 6, with respect to the sprocket 7, is restricted and both end faces of the roller 6 are positioned inside both side faces of the sprocket 7. Upon engagement of the roller 6 with the sprocket 7, the toothed top of the sprocket 7 gets in between the inner plates 3 located on both sides of the roller 6, whereby the transverse movement of the inner plates 3 is restricted, with a clearance S being formed between both end faces of the roller 6 and the right and left inner plates 3.

In the above-described construction, when the roller 6 is about to engage the toothed surface 7A of the sprocket 7, first the ridge portion 6A of the roller 6 comes into abutment against the elastic member 8 embedded in the slot 7B of the toothed surface 7A, so that the noise generated by collision of the roller 6 with the sprocket 7 is suppressed by the buffer action of the elastic member 8. At this time, the elastic member 8 is elastically deformed by the ridge portion 6A of the roller 6 into the slot 7B, and the ridge portion 6A gets into the slot 7B, whereby the roller 6 is positioned centrally of the sprocket 7 and a clearance S is formed between both end faces of the roller 6 and the inner plates 3 located on both sides of the roller 6, as mentioned previously. In this way the generation of a rubbing sound, caused by sliding contact between the inner plates and the end faces of the roller, is prevented.

Figure 2A:
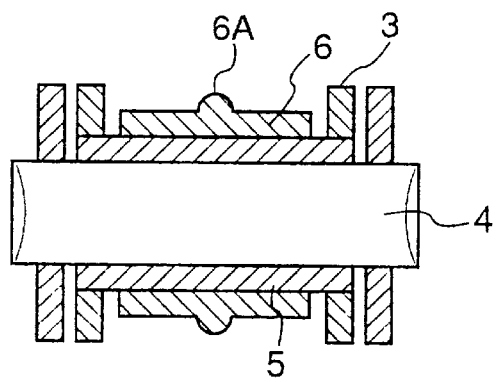
Figure 2B:
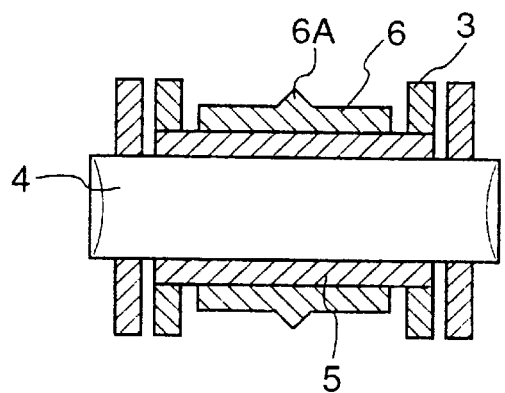
Figure 2C:
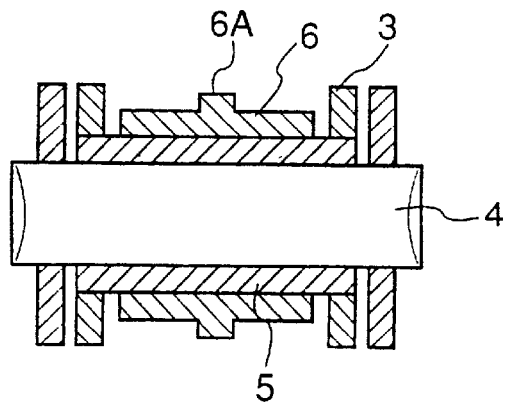

FIGS. 2(a)–(c) show examples of various cross-sectional shapes of the ridge portion 6A formed on the outer peripheral surface of the roller 6. FIG. 2(a) shows a ridge portion 6A of a semicircular cross-sectional shape, which possesses both a function of conducting the roller 6 for engagement of the ridge portion 6A into the slot 7B formed in the sprocket toothed surface 7A upon roller-sprocket engagement and a function of allowing an impact force to be absorbed efficiently by the elastic member 8. The ridge portion 6A shown in FIG. 2(b) is chevron-shaped. Since it has a sharp tip, the function of causing the elastic member 8 to absorb an impact force is somewhat inferior, but the function of conducting the roller 6 for engagement of the ridge portion 6A with the slot 7B is superior, in comparison with the ridge portion 6A having a semicircular cross-section as is shown in FIG. 2(a). The ridge portion 6A, shown in FIG. 2(c), has a square cross-sectional shape with a flat surface for abutment with the elastic member 8, so that an impact force is dispersed uniformly throughout the elastic member 8 and hence, a high impact absorbing effect is attained. However, since the cross-sectional shape is square, it is necessary that both sides of the slot 7B, formed in the sprocket toothed surface 7A of the sprocket 7, be tapered so as to be expanded radially outwardly, thereby permitting the ridge portion 6A to be conducted into the slot 7B.

FIG. 3(a)–(c) show examples of support structures for the elastic member 8, wherein each of the support structures is capable of being embedded by press-fitting or insert molding into a slot 7B formed in the sprocket toothed surface 7A of the sprocket 7. In FIG. 3(a), a slot 7B of a square cross-sectional shape is formed in the toothed surface 7A of the sprocket 7, and the lower portion of an elastic member 8, fitted in the slot 7B, also has a square cross-sectional shape in conformity with the cross-sectional shape of the slot 7B. In FIG. 3(b), a V-shaped slot 7B is formed in the sprocket toothed surface 7A, and an elastic member 8, having a wedge-shaped lower portion in conformity with the shape of the slot 7B, is fitted in the slot 7B. Further, the slot. 7B, shown in FIG. 3(c), is of a cross-sectional shape having a circularly expanded portion, and the elastic member 8 shown therein has an expanded portion of a circular cross-sectional shape conforming to the cross-sectional shape of the slot 7B, thereby making it difficult for the elastic member 8 to come out of the slot 7B.

FIG. 4 shows an example in which tapped holes 7C are formed in plural circumferential positions of a side face of the sprocket 7 so as to extend up to a slot 7B formed in the sprocket toothed surface 7A, and set-screws 9 are threaded into the tapped holes 7C to fix an elastic member 8 which is embedded in the sprocket toothed surface 7A.

FIG. 5 shows one manner in which the sprocket 7, having the elastic member 8 embedded in the slot 7B thereof, may be produced efficiently. First, FIG. 5A shows a sprocket stock A which is to be cut to form a semi-finished product B as shown in FIG. 5B. The semi-finished product B of FIG.

Figure 5A:
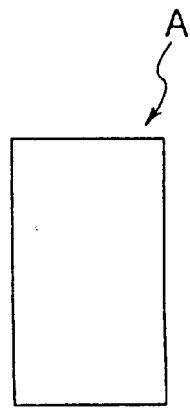
Figure 5B:
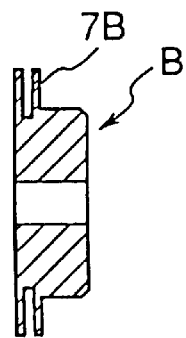
Figure 5C:
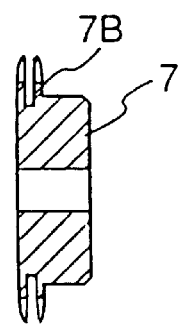
Figure 5D:
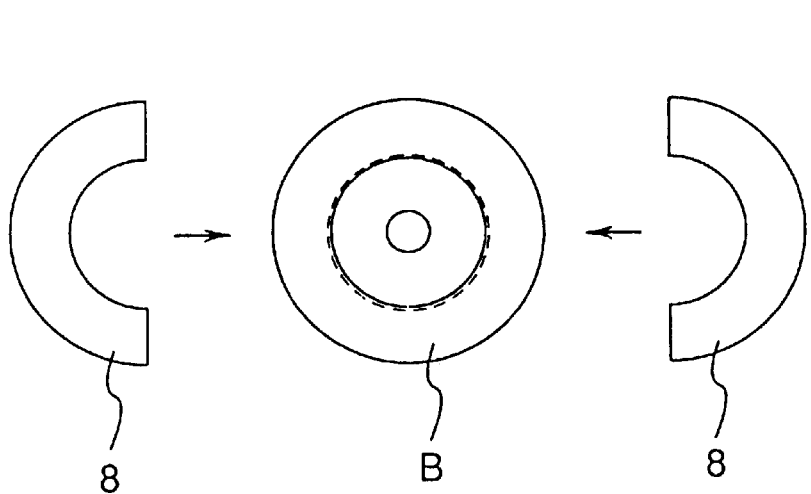
Figure 5E:
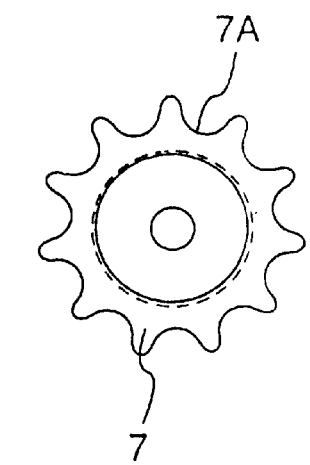

5B shows an outer contour prior to formation of a toothed surface 7A. FIG. 5B also shows that a slot 7B is formed in the outer edge of the sprocket 7 to form the semi-finished product B. FIG. 5C shows further cutting of the outer edges of the sprocket 7 near the slots 7B. FIG. 5D shows halves of elastic member 8 being press-fitted from both sides into the slot 7B formed in the semi-finished product B. The press-fitting may be substituted by insert molding into the semi-finished product B. FIG. 5E shows the semi-finished product B, which has with the elastic member 8 press-fitted into the slot 7B, being subjected to gear cutting to form a toothed surface 7A. In this way, the sprocket 7 is completed.

Figure 6:
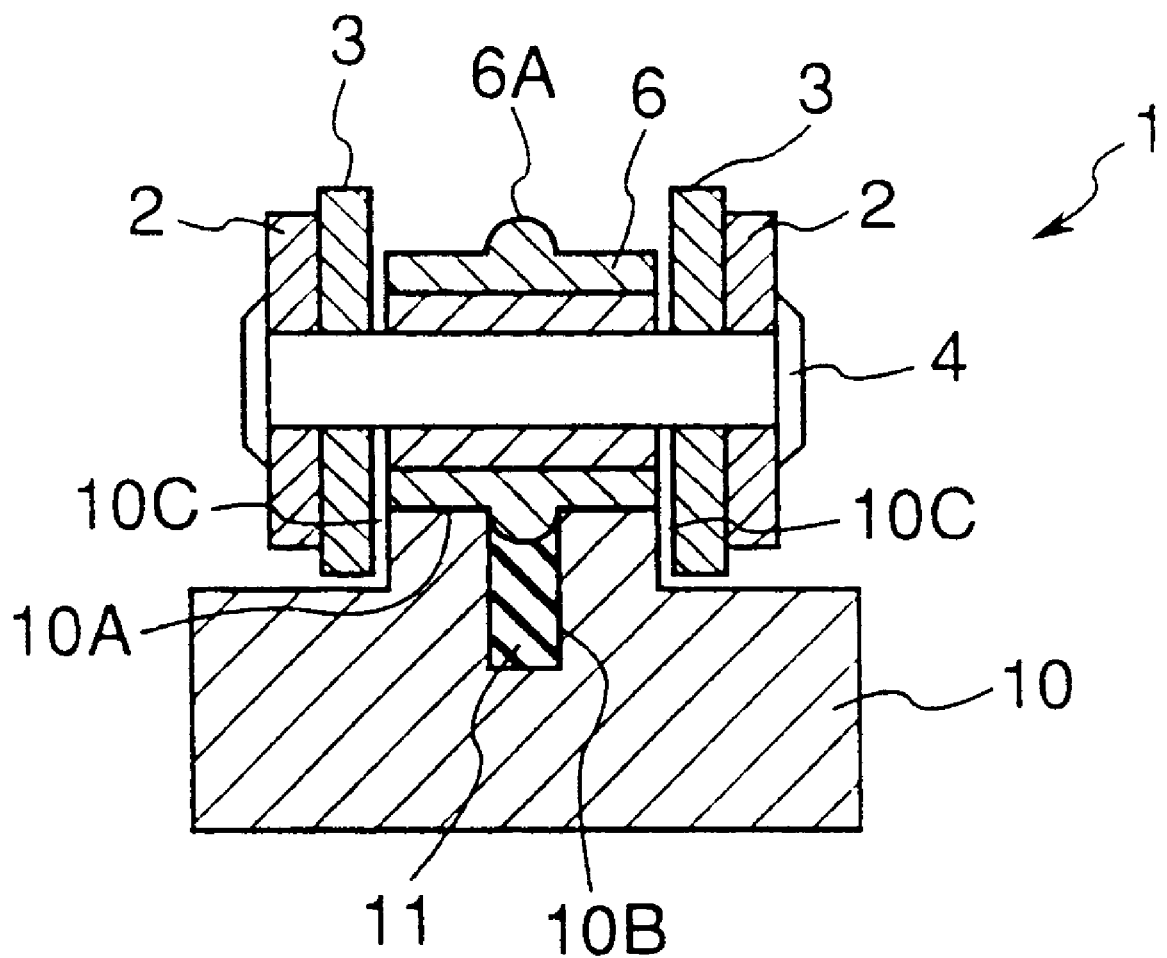

Referring now to FIG. 6, a second embodiment of the present invention is illustrated. In the second embodiment, the travel of a roller chain 1 is guided by a chain guide 10, which chain guide has a roller bearing surface 10A for rolling of a roller 6 thereon. On the outer peripheral surface of the roller 6, a ridge portion 6A is formed, while in the roller bearing surface 10A of the chain guide 10, a slot 10B is formed for fitting of the ridge portion 6A therein. An elastic member 11 (for example, of rubber or plastic material) is embedded in the slot 10B. The exposed surface of the elastic member 11, in a natural state thereof, is substantially flush with the roller bearing surface 10A, while when pushed by the ridge portion 6A of the roller 6, the elastic member 11 is elastically deformed into the slot 10B.

The width of the roller bearing surface 10A is a little larger than the length of the roller 6 so that in the position where the ridge portion 6A is fitted in the slot 10B, both end faces of the roller 6 are received within the width of the roller bearing surface 10A. Further, on both sides of the roller bearing surface 10A of the chain guide 10, plate guide faces 10C are formed for guiding opposed surfaces of inner plates 3 located on both sides of the chain 1. When the roller chain 1 travels on the chain guide 10, the right and left inner plates 3 are guided by the plate guide faces 10C, whereby transverse deflections of the roller chain 1 are prevented and the roller 6 is supported by the roller bearing surface 10A. At this time, the ridge portion 6A of the roller 6 rolls on the roller bearing surface 10A, while pushing the elastic member 11 into the slot 10B formed in the roller bearing surface 10A, so that vibration and noise induced by traveling of the roller chain 1 are suppressed by the elastic member 11. At the same time, the opposed surfaces of the right and left inner plates 3 and both end faces of the roller 6 are spaced from each other, so that the generation of a rubbing sound, caused by sliding contact of the roller 6 with the inner plates 3, is prevented.

Although in the above-described embodiments, there is only one ridge portion 6A formed on the roller 6 and only one slot 7B formed in the sprocket toothed surface 7A or in the roller bearing surface 10A of the chain guide 10, they may each be formed in a plural number according to, for example, the roller length.

Advantages of the Invention

First, in the noise preventing structure of a roller chain according to the present invention, as set forth hereinabove, a circumferentially continuous ridge portion is formed on the outer peripheral surface of a roller, while in the toothed surface of a sprocket with which the roller comes into engagement, a slot is formed in which the ridge portion is fitted to guide and hold both end faces of the roller in positions spaced from inner plates located on both sides of the roller, and an elastic member is embedded in the slot. Therefore, upon engagement of the roller with the sprocket, the elastic member abuts the ridge portion to suppress the sound of collision between the roller and the sprocket and the vibration of the sprocket is dampened to diminish the chatter of the sprocket. Besides, since the contact between the inner plates and the roller is prevented, no rubbing sound is generated between the inner plates and the roller. Thus, the operation noise of the roller chain can be greatly diminished.

Secondly, in the noise preventing structure of a roller chain according to the present invention, a circumferentially continuous ridge portion is formed on the outer peripheral surface of a roller, while in the roller bearing surface of a chain guide on which the roller rolls, a slot is formed in which the said portion is fitted to guide and hold both end faces of the roller in positions spaced from inner plates located on both sides of the roller, and an elastic member is embedded in the slot. Consequently, it is possible to reduce the noise generated when the roller chain travels while being guided by the chain guide. Moreover, since the inner plates and the roller are prevented from contacting each other, no rubbing sound is generated between the inner plates and the roller. In this way, it is possible to greatly diminish the operation noise of the roller chain.

What is claimed is:

1. A chain drive mechanism for suppressing noise, comprising:

a roller chain including a roller and a pair of side plates, said roller extending between said pair of side plates and having an axial length which is less than a spacing between said side plates and an outer peripheral surface having a circumferential ridge provided substantially midway across said axial length;

a sprocket engaging said roller chain, wherein said sprocket has a toothed surface engaging said outer peripheral surface of said roller;

a circumferential groove is formed in said toothed surface substantially transversely midway across a width of said sprocket, wherein said circumferential groove fittedly receives said circumferential ridge of said roller to restrict movement of said roller relative to said sprocket in a direction parallel to an axis of said roller when said roller engages said sprocket and thereby maintains a spacing between an end of said roller and a respective adjacent one of said side plates; and an elastic member embedded in said circumferential groove in said sprocket, wherein said elastic member elastically engages said cirumferential ridge of said roller to buffer an engagement of said roller and said sprocket.

2. The chain drive mechanism according to claim 1, wherein said circumferential ridge of said roller has a semi-circular cross-sectional shape and includes a round circumferential edge.

3. The chain drive mechanism according to claim 1, wherein said circumferential ridge of said roller has a triangular cross-sectional shape and includes a pointed tip.

4. The chain drive mechanism according to claim 1, wherein said circumferential ridge of said roller has a square cross-sectional shape and includes a flat circumferential edge.

5. The chain drive mechanism according to claim 1, wherein said elastic member has a surface exposed to said groove and is substantially flush with said toothed surface of said sprocket.

6. A chain drive mechanism for suppressing noise, comprising:

a roller chain including a roller and a pair of side plates, said roller extending between said pair of side plates and having an axial length which is less than a spacing between said side plates and an outer peripheral surface having a circumferential ridge provided substantially midway across said axial length;

a chain guide for guiding said roller chain, wherein said chain guide has a roller bearing surface for rolling engagement with said roller;

an elongated groove formed in said roller bearing surface of said chain guide, wherein said groove fittedly receives said circumferential ridge of said roller to restrict movement of said roller relative to said chain guide in a direction parallel to an axis of said roller when said roller rolls on said roller bearing surface and thereby maintain a space between an end of said roller and a respective adjacent one of said side plates; and an elastic member embedded in said elongated groove in said chain guide, wherein said elastic member is elastically engageable with said circumferential ridge of said roller to a buffer an engagement of said roller and said chain guide.

* * * * *